(12) United States Patent
Hubbs

(10) Patent No.: US 7,609,439 B2
(45) Date of Patent: Oct. 27, 2009

(54) MASK OVERLAY FOR INFRARED TARGET ASSEMBLY

(75) Inventor: William O. Hubbs, Cedar Hill, MO (US)

(73) Assignee: Hubbs Machine & Manufacturing Co., Cedar Hill, MO (US)

( * ) Notice: Subject to any disclaimer, the term of this patent is extended or adjusted under 35 U.S.C. 154(b) by 535 days.

(21) Appl. No.: 11/325,972

(22) Filed: Jan. 4, 2006

(65) Prior Publication Data

US 2006/0145099 A1 Jul. 6, 2006

Related U.S. Application Data

(60) Provisional application No. 60/641,828, filed on Jan. 5, 2005.

(51) Int. Cl.
*G02B 13/14* (2006.01)

(52) U.S. Cl. ............ 359/356; 359/355; 359/738; 359/819; 356/51; 250/237 R; 250/239

(58) Field of Classification Search ............ None
See application file for complete search history.

(56) References Cited

U.S. PATENT DOCUMENTS 5,073,005 A 12/1991 Hubbs
2002/0034000 A1* 3/2002 Hoult et al. ............ 359/350

* cited by examiner

*Primary Examiner*—Stephone B Allen
*Assistant Examiner*—Derek S Chapel
(74) *Attorney, Agent, or Firm*—Paul M. Denk

(57) ABSTRACT

An infrared target for use with indoor industrial G.P.S. has at least one mask or overlay applied to the lens of the target. The mask increases the precision of setting the location of any instrument, assembly, machinery, or component to be machined, during industrial applications. The mask improves position tolerances to 0.0005 inch or less. Further, a reflective ring positioned upon the overlay serves as a marker for laser light at lesser tolerance than the overlay.

7 Claims, 3 Drawing Sheets

MASK OVERLAY FOR INFRARED TARGET ASSEMBLY

CROSS-REFERENCE TO RELATED APPLICATIONS

This is a non-provisional application which claims priority to the provisional application Ser. No. 60/641,828 filed Jan. 5, 2005. The above noted application is incorporated herein by reference.

BACKGROUND OF THE INVENTION

This invention relates generally to an infrared laser target that provides for critical detection of the infrared beam from a surveying transmitter. for indoor Global Positioning System (hereinafter G.P.S.), and more specifically to a mask overlay for an infrared target assembly that provides for precise work area settings within +/−0.0005 inch or less.

Targets with closely located mask overlays, for use in photogrammetry and automated theodolite systems have been available for years. Generally, of more current usage, the present invention incorporates the Global Positioning System or G.P.S., only on an indoor scale, as an optional method to precisely set various industrial devices and industrial equipment, including machinery and for close tolerance industrial surveying, as used in manufacturing and assembly operations. Normally, infrared targets without the mask overlay only have tolerances within several thousandths of an inch, which may be insufficient to obtain the precision required in a machining operation, the manufacturing of parts necessary for particular industries, or industrial surveying. Additionally, laser scanners emit a laser beam along a line. That laser line represents the position of an edge used in a step of manufacturing, such as the position of a composite lay up sheet.

For reference, retro-reflective photo targets, with a mask overlay have had countless design adaptations to enhance precision for the various settings and component features that are measured using close range industrial photogrammetry. These adaptations may include straight holes, threaded holes, surfaces, edges, slots and the like. The prior art frequently obtains tolerances in the vicinity of 0.0005 inch.

Currently, most targets, for the photogrammetric methods and systems generally use a 3M® type tape material that has small glass beads coated onto its top surface, with a reflective coating on the back side of the beads, and integral with the tape. When the strobe light from the photogrammetric camera fires, it causes the glass beads on the tape to reflect the light and thereby creates spots of light that appear on a photograph. The spots are then measured for three-dimensional locations in the X, Y and Z axes.

Commonly some targets, as used in photogrammetry, serve as reference points, without achieving a critical X, Y and Z location. These types of targets may be simply an adhesive strip upon a machine or item to be surveyed.

However, many targets require critical dimensions and are mounted upon a close tolerance steel body that supports the target. These are generally called hard body targets. The intention is for the retro-reflective target to be located quite precisely in three dimensions on the body which in turn usually represents an X, Y and Z value of the machine or item being positioned or surveyed. The 3M® retro-reflective material is adhered to a tape product of a known definite thickness, the material being covered with small glass beads of approximately 0.003 inch diameter. This material has a granular appearance similar to that of grit on sandpaper.

The beads are 0.003 inch in diameter but, in many machining operations, the tolerance of the target dot location must be +/−0.0005 inch or less. As a result, the components of the standard materials without a mask overlay make it impossible to meet the tolerances required.

To accomplish the final close tolerance that complies with job requirements, some industries use a mask overlay that is critically located in two directions, and a third critical location is the surface of the 3M® material that adheres to the tape and compensates for the thickness of the material used. The final application of the mask overlay produces an area of reflectivity that is controlled by size, roundness, crispness, clarity and critical location in relation to the target body.

As can be seen in the prior art and in U.S. Pat. No. 5,073, 005, to Hubbs, obtaining greater precision through the usage of a mask overlay, applied over a target, and a mask that may have a reflective member applied upon it, can attain precise locations, generally within 0.001 inch tolerance or less. This occurs through the use of a mask that has a finite aperture that allows the entrance of the light from the camera strobe therethrough, and adds precision to the establishment of the X, Y and Z axes when such a surveying instrument, applying photogrammetry, is used.

This new invention also uses a mask overlay and a reflective ring but operates within a system of multiple transmitters mounted and secured high inside of a manufacturing facility somewhat similar to orbiting satellites. These transmitters send out an infrared signal beam, recognized by one or more detectors and then later emit a laser beam from a scanner. One type of detector is the flat detector, which is available from Arc Second, of Dulles, Va., which owns the indoor G.P.S. measurement system. The prior art flat detector target assemblies have an engraved mask proximate to the lens.

Sometimes, the detector has no critical X, Y, Z values, and may be used simply as a reference, possibly to detect movement. However, like the hard body photo target, there is a need for a target assembly that has definite close tolerance X, Y, Z values. This accurate target can then interface with other features on items being measured or monitored such as straight holes, threaded holes, surfaces, edges and others. An example of such a target requirement is from Bombardier, Inc. of Montréal, Québec. Again, like the photo target, the hard body target takes many forms.

The goal of this invention is to produce an infrared laser target that represents X, Y, Z values within a tolerance of approximately +/−0.0005, or finer. We reach this goal by applying the mask overlay and the reflective ring to the target. The mask overlay locates the target precisely via the infrared beam of the G.P.S. The reflective ring then allows a laser scanner to establish a known line from the target previously located. The current design consists of multiple components, some having close tolerance assembly features. The difficulty of manufacturing multiple components with very close tolerances is that variations or tolerances stack up, or accumulate, during assembly of a target which jeopardizes the goal of a final target at a location within a 0.0005 inch or less tolerance.

SUMMARY OF THE INVENTION

The essence of this invention is to provide a means for achieving very close tolerances, within +/−0.0005 inch in the assembly and usage of an infrared G.P.S. target as used in indoor G.P.S. systems. The current invention is designed to provide an overlay and a ring, at a precise location, and that eliminate assembly irregularities and tolerance stacking, to furnish more accurate focusing of the infrared laser beam cooperating with the infrared laser detector to attain precise mechanical settings. The approach of this invention will be to accurately apply the thin mask overlay and ring to the finished target so the inside diameter of the overlay and the ring will be concentric and on the center line of the locating shank beneath the target within +/−0.0005 inch precision thereby overcoming all of the other inefficiencies from the stack up of errors.

The principle object of this invention is to provide an improvement in the technology of indoor G.P.S. targets to more precisely locate a mask within +/−0.0005 inch, or less which in turn provides a value tolerance of +/−0.0005 inch.

Another object of this invention is to provide a means for modification of the targets used in indoor G.P.S. to achieve greater precision in instrument and machinery settings, machined components or locations as applied in many industries including close tolerance industrial surveying.

Another object of this invention is to provide a means for establishing a known line based upon the precisely located target.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
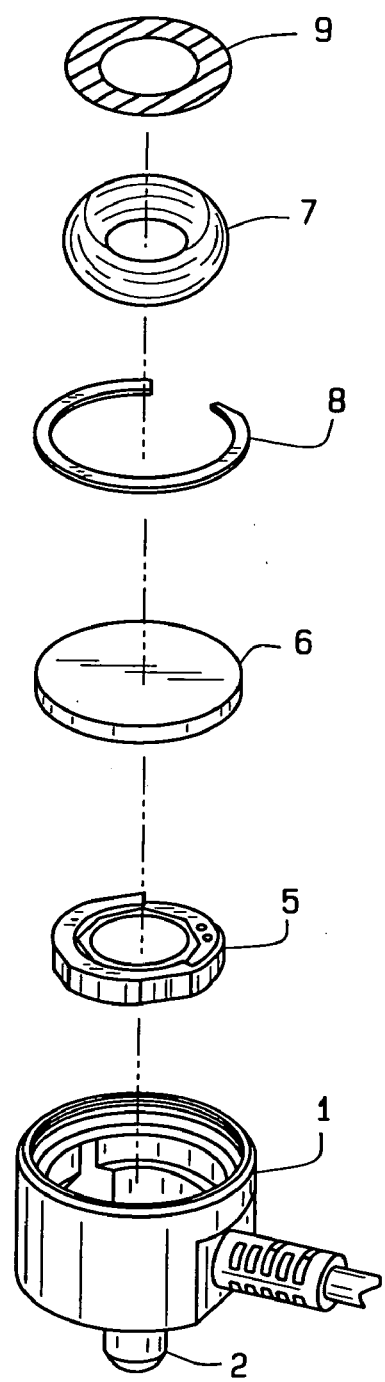
FIG. 1 shows an exploded view of the modified target of this current invention.

In referring to the drawings, the mask overlay of this invention is readily disclosed, as it is prepared for use in infrared target assembly in manufacturing or other operations. Generally, this type of technology has grown in usage throughout industrial surveying, and is commonly called indoor G.P.S. Because the target configurations are many, the key to the current invention is a precisely located and very thin mask overlay, applied to the target. The inside diameter or aperture of the overlay is the critical element.

At the present time, the lens component of a typical target has a ground groove area on top of the assembly that is filled with an opaque paint. This painted ring within the glass serves like a mask, but still has the stack up of tolerances when assembled that leads to irregularities in manufacturing.

The infrared target assembly of this invention comprises a target body 1 with a shank 2, a perpendicular locating surface and a precisely held locating ledge that accepts the infrared lens that defines the offset height. Within the target body is the flat detector that is less precisely located. The lens may be retained by the retaining ring 8 of the target 1. With the assembly complete to this point, next the mask overlay 7 of this invention is applied to the lens. Upon the mask overlay 7, a reflective ring 9 is then applied. The mask overlay inside diameter establishes and defines the target assembly's accuracy. The reflective ring is concentric with the overlay below.

The mask overlay 7 and reflective ring 9 of this invention are applied with the same process as the photo targets, except rather than making contact with the retro-reflective material, and the steel target body, the mask overlay in this case would contact the lens itself. The mask overlay, rather than defining and controlling the spot of reflectivity coming outwardly from the retro-reflective material on the photo target, as the retro-reflective material is fluoresced from the photogrammetry camera strobe, would define and control the infrared beam being applied inwardly to the flat detector. The final location of the inside diameter of the mask overlay 7 is within +/−0.0005 inch of centerline of the critical target body and the shank 2. The mask overlay 7 and its precise location on a lens 6 and target body assembly are the keys to the present invention. Additionally, and as a less desirable option, the overlay and ring may be applied to the lens 6 either on the top or on the bottom of the lens, as shown in FIG. 3, separately from the partially assembled target at a later date when the stack up of the assembly tolerances would induce additional irregularities in manufacturing.

Figure 2:
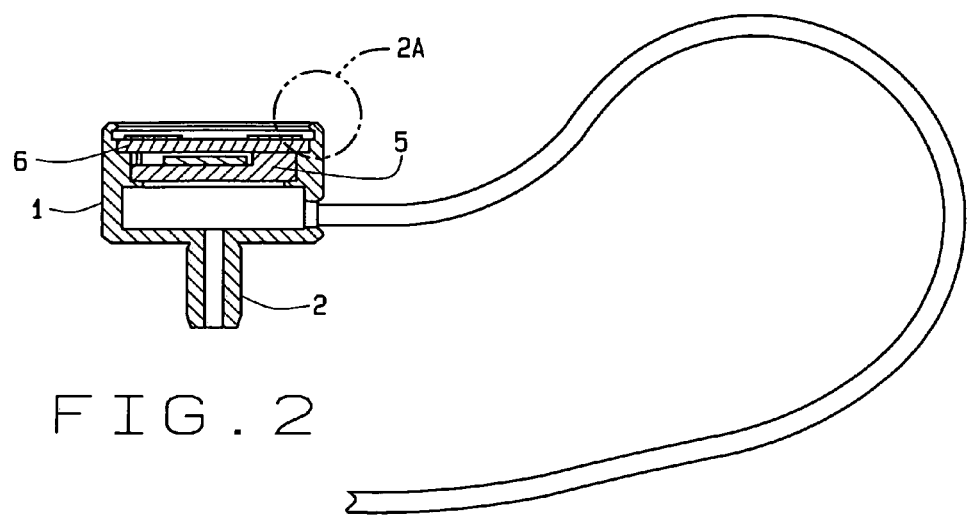
FIG. 2 provides a cross-sectional view of the assembled target assembly with mask overlay that furnishes greater precision in its usage and settings.
Figure 3:
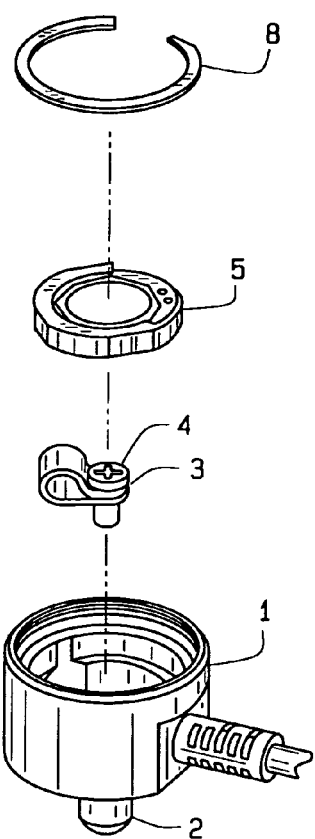
FIG. 3 shows the mask overlay and its various components as they are applied just prior to assembly for the alternate embodiments.

As can be seen in FIGS. 1-3, various less critical components appear that may vary in future designs Above the flat detector 5 is located the masked glass or lens 6, as noted. A mask overlay 7 gives greater precision to the target, during usage, and is applied to the top of the glass lens 6, at final assembly, as shown in FIG. 3b. The compression ring 8 may be applied above the masked glass lens 6, while the flat detector 5 has a location below the glass lens 6 in the assembled target 1.

Through this target, with the thin polyester mask being applied to the top of the glass lens at assembly, greater precision arises because of the more precise focus of the infrared laser beam, when received by the detector, during setting of machinery or components of an industrial assembly operation. In the preferred embodiment, the mask is opaque and resists creep induced by normal ambient temperatures. FIG. 2 shows the cross section of the target 1 with the mask 7 applied to the lens 6 upon its top to reduce the radial variations induced through stack up of assembly tolerances.

Figure 2B:
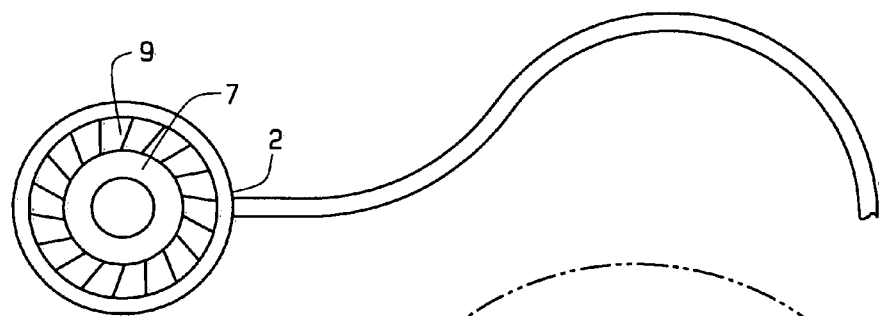
FIG. 2b describes a top view of the target showing both overlays.
Figure 2A:
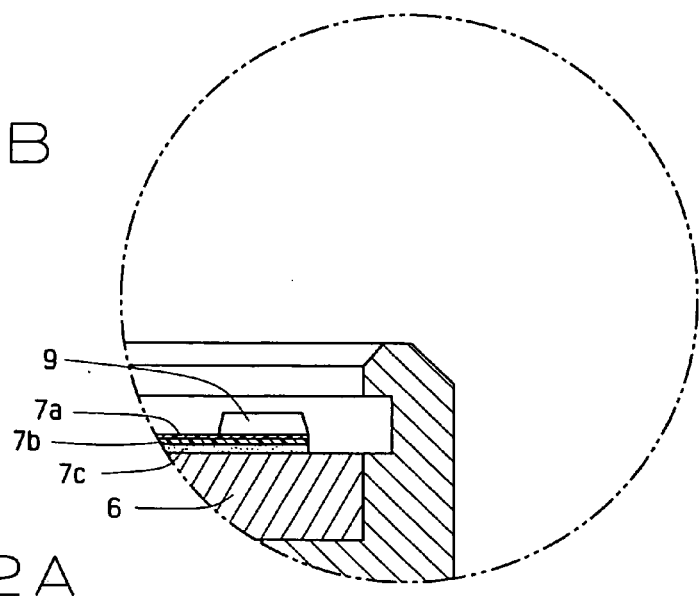
FIG. 2a illustrates a detailed view of the overlay and lens proximate the edge of the target.

FIG. 2a shows the included edge of the present invention in more detail. The lens 6 abuts the target 1 generally above the detector 5. The mask overlay joins to the surface of the lens with an adhesive 7C suitable for adhering to glass. The mask overlay preferably comprises a polyester film 7B, generally having an opaque finish 7A opposite the adhesive. The reflective ring 9 joins to the surface of the overlay 7, generally towards the perimeter of the overlay.

The appearance of the assembled target is then shown in FIG. 2b. The detector appears below the lens. The lens is partially covered by the mask overlay 7. In the preferred embodiment, the overlay has an inside diameter of 0.312 inches and a black color. The reflective ring 9 is located upon the same centerline as the overlay 7 however, in the preferred embodiment the ring 9 has an inside diameter of 0.500 inches and a centerline location tolerance of 0.005 inches. The centerline tolerance of the ring is less than the detector because of the granular makeup of the ring material. Preferably, the ring is 3M® reflective tape, model number 7610. The inside diameter of the ring permits the infrared beam of the indoor G.P.S. to reach the detector within the target. The outside diameter of the ring exceeds that of the overlay thus preventing light from leaking into the target. The ring then reflects laser light emitted by a scanner to establish a known line used in manufacturing and other precision tasks.

Figure 3A:
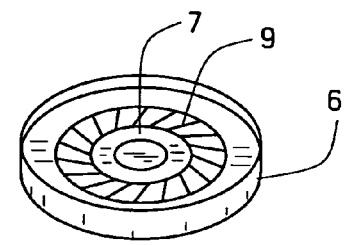
Figure 3B:
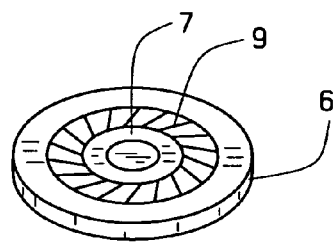

Alternatively, the mask overlay 7 and the ring 9 may be applied only to the bottom of the glass lens 6, and may yet work but not as effectively in attaining precise industrial settings, as shown in FIG. 3a.

Variations or modifications to the subject matter of this invention may occur to those skilled in the art upon review of the summary as provided herein, and upon undertaking a study of the description of its preferred embodiment. Such variations, if within the spirit of this development, are intended to be encompassed within the scope of the invention as devised. The description of the preferred embodiment, as disclosed in the drawings, is generally set forth for illustrative purposes only.

I claim:

1. An improvement to an infrared target assembly used in industrial surveying, the assembly including a body having an axial centerline with a detector beneath a lens within said body, said improvement comprising:

an overlay opaque to visible light and infrared radiation, having a central round hole, and centerline, for admitting infrared radiation and a precise location upon the lens and within the assembly thus locating the centerline of the overlay within a tolerance of 0.0005 inches or less of the centerline of the body, said overlay and said target assembly operating at approximately room temperature; and a reflective ring, having a central round hole of greater diameter than the central hole of said overlay and for admitting laser radiation, said ring located upon said overlay and abutting said assembly, and said reflective ring reflecting radiation outward from said assembly.

2. The improvement of claim 1 wherein said overlay is round and planar and said ring is round and planar.

3. The improvement of claim 1 wherein said ring and said overlay is applied to the bottom of the lens.

4. The improvement of claim 1 wherein said ring and said overlay is applied to the top of the lens.

5. The improvement of claim 1 wherein said ring and said overlay are applied within said target assembly by an adhesive located outwardly from the central round holes of said ring and said overlay.

6. The improvement of claim 1 wherein said overlay is polyester.

7. The improvement of claim 6 wherein said overlay is black.

* * * * *